(12) United States Patent
Liong

(10) Patent No.: US 11,848,993 B2
(45) Date of Patent: Dec. 19, 2023

(54) APPARATUSES AND METHODS OF SIGNALING ENHANCEMENT FOR ALWAYS-ON PROTOCOL DATA UNIT (PDU) SESSION

(71) Applicant: Wistron Corp., New Taipei (TW)

(72) Inventor: Jian Wah Liong, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 17/507,124

(22) Filed: Oct. 21, 2021

(65) Prior Publication Data

US 2023/0048935 A1 Feb. 16, 2023

(30) Foreign Application Priority Data

Aug. 3, 2021 (TW) .................................. 110128510

(51) Int. Cl.
*H04L 67/14* (2022.01)

(52) U.S. Cl.
CPC .................................... *H04L 67/14* (2013.01)

(58) Field of Classification Search
CPC . H04W 28/0268; H04W 76/10; H04W 76/12; H04W 28/10; H04W 80/08; H04W 60/04; H04W 8/08; H04W 68/005; H04W 76/11; H04W 76/22; H04L 67/14
See application file for complete search history.

(56) References Cited

U.S. PATENT DOCUMENTS

| 2015/0029998 A1* | 1/2015 | Sayenko | H04W 36/0016 |
| | | | 370/331 |
| 2017/0064487 A1* | 3/2017 | Buckley | H04W 60/00 |
| 2018/0288732 A1* | 10/2018 | Balasubramaniam | |
| | | | H04L 1/1851 |
| 2019/0150219 A1* | 5/2019 | Wang | H04W 76/30 |
| | | | 370/329 |
| 2019/0349849 A1* | 11/2019 | Kavuri | H04W 36/0022 |

(Continued)

FOREIGN PATENT DOCUMENTS

| CN | 110831031 A | 2/2020 |
| WO | 2020/071502 A1 | 4/2020 |

(Continued)

OTHER PUBLICATIONS

5G; Procedures for the 5G System (5GS) 3GPP TS 23.502 version 15.5.1 Release 15 (May 2019) (Year: 2019).*

(Continued)

*Primary Examiner* — Patrice L Winder
(74) *Attorney, Agent, or Firm* — McClure, Qualey & Rodack, LLP

(57) ABSTRACT

A method of signaling enhancement for an always-on PDU session is provided. A User Equipment (UE) transmits a Non-Access Stratum (NAS) request message to a mobile communication network. The NAS request message includes an Always-on PDU Session Requested (APSR) Information Element (IE). The UE receives a NAS response message including an Always-on PDU Session Indication (APSI) IE from the mobile communication network. The APSI IE includes a time length indicator. In response to the APSI IE indicating that the always-on PDU session is not allowed, the UE starts a timer based on the time length indicator and retransmits the NAS request message to the mobile communication network when the timer expires.

13 Claims, 8 Drawing Sheets

(56) References Cited

U.S. PATENT DOCUMENTS

| | | | |
|---|---|---|---|
| 2019/0364541 A1* | 11/2019 | Ryu | H04W 80/10 |
| 2020/0092932 A1* | 3/2020 | Youn | H04W 76/20 |
| 2020/0113004 A1* | 4/2020 | Huang-Fu | H04W 80/10 |
| 2020/0120751 A1* | 4/2020 | Sugawara | H04W 80/10 |
| 2020/0213897 A1* | 7/2020 | Qiao | H04M 15/66 |
| 2020/0214054 A1* | 7/2020 | Qiao | H04W 48/18 |
| 2020/0260525 A1* | 8/2020 | Gan | H04W 48/18 |
| 2020/0314955 A1* | 10/2020 | Velev | H04W 52/0219 |
| 2021/0022099 A1* | 1/2021 | Kumar | H04W 80/08 |
| 2021/0051739 A1* | 2/2021 | Kweon | H04W 28/0268 |
| 2021/0076444 A1* | 3/2021 | Shu | H04W 76/25 |
| 2021/0136858 A1* | 5/2021 | Kawasaki | H04W 76/20 |
| 2021/0160186 A1* | 5/2021 | Xu | H04W 36/0011 |
| 2021/0204357 A1* | 7/2021 | Tang | H04W 76/25 |
| 2021/0211970 A1* | 7/2021 | Lee | H04W 48/06 |
| 2021/0250890 A1* | 8/2021 | Won | H04W 76/11 |
| 2021/0274387 A1* | 9/2021 | Kousaridas | H04W 24/10 |
| 2021/0306971 A1* | 9/2021 | Comaravelou | H04W 76/25 |
| 2021/0321487 A1* | 10/2021 | Moon | H04W 80/06 |
| 2021/0368383 A1* | 11/2021 | Jangid | H04W 76/18 |
| 2022/0015174 A1 | 1/2022 | Aramoto et al. | |
| 2022/0022089 A1* | 1/2022 | Zhu | H04W 28/0268 |
| 2022/0022128 A1* | 1/2022 | Takakura | H04W 48/12 |
| 2022/0078862 A1* | 3/2022 | Cakulev | H04W 8/18 |
| 2022/0110024 A1* | 4/2022 | Consoli | H04W 28/24 |
| 2022/0151004 A1* | 5/2022 | Sedlacek | H04W 8/082 |
| 2022/0159605 A1* | 5/2022 | Li | H04W 60/00 |
| 2022/0191100 A1* | 6/2022 | Kim | H04L 41/0893 |

FOREIGN PATENT DOCUMENTS

| | | | |
|---|---|---|---|
| WO | 2020/171312 A1 | | 8/2020 |
| WO | WO-2021029513 A1 | * | 2/2021 |

OTHER PUBLICATIONS

English Translation from Espacenet.com for foreign patent application publication Kim, H WO-2021029513-A1, 189 pages. (Year: 2021).*

Partial European Search Report dated May 18, 2022, issued in application No. EP 21212056.2.

Chinese language office action dated Jun. 10, 2022, issued in application No. TW 110128510.

3GPP TS 24.501 V17.3.1; "3rd Generation Partnership Project; Technical Specification Group Core Network and Terminals; Non-Access-Stratum (NAS) protocol for 5G System (5GS);" Jun. 2021; pp. 1-800.

Ericsson; "5G SM-PDU session address lifetime PCO parameter;" Feb.-Mar. 2018; pp. 1-11.

Japanese language office action dated Feb. 21, 2023, issued in application No. JP 2022-001673.

* cited by examiner

APPARATUSES AND METHODS OF SIGNALING ENHANCEMENT FOR ALWAYS-ON PROTOCOL DATA UNIT (PDU) SESSION

CROSS REFERENCE TO RELATED APPLICATIONS

This Application claims priority of Taiwan Patent Application No. 110128510, filed on Aug. 3, 2021, the entirety of which is incorporated by reference herein.

BACKGROUND OF THE APPLICATION

Field of the Application

The application generally relates to mobile communications and, more particularly, to apparatuses and methods of signaling enhancement for always-on Protocol Data Unit (PDU) session.

Description of the Related Art

In a typical mobile communication environment, a UE (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

According to the 3GPP specifications for 5G NR, a UE may request one or more always-on PDU sessions after connecting to a 5G network. Generally speaking, always-on PDU sessions may be used for multimedia services or mobile services with low-latency requirements. For example, Vehicle-to-Everything (V2X) services that require high bandwidth and low latency may use always-on PDU sessions to obtain persistent service connectivity.

However, some issues regarding controls over always-on PDU sessions exist in the current 3GPP specifications, and problems may be caused. For one thing, it is not defined what a 5G network should do with an always-on PDU session if the UE that requested the always-on PDU session has left the 5G network, and this always-on PDU session may be lay idle, causing waste of network resources. For another, it is defined that a 5G network may respond to the UE's request of an always-on PDU session with an acceptance message including an indication "always-on PDU session not allowed", and if this happens, the UE should keep resending the request to the 5G network. Disadvantageously, the frequent signaling will result in unnecessary power consumption of the UE and waste of network resources.

BRIEF SUMMARY OF THE APPLICATION

In order to solve the aforementioned problems, the present application proposes signaling enhancements for always-on PDU sessions. Specifically, new parameters are introduced in the PDU session establishment/modification procedure to activate a retry backoff mechanism in the UE side for holding off the resending of the PDU SESSION ESTABLISHMENT/MODIFICATION REQUEST message, and to activate a lifetime mechanism in the network side for configuring the lifetime of an always-on PDU session. To further clarify, the retry backoff mechanism may ensure that the UE waits for a certain period of time before resending the PDU SESSION ESTABLISHMENT/MODIFICATION REQUEST message, so that frequent signaling may be avoided. The lifetime mechanism allows the network to count down a predetermined period of time representing the lifetime of the always-on PDU session when detecting that the UE has left the network (e.g., the UE switching to another network due to bad signal quality of the current network or due to the user selecting another RAT), and if the UE hasn't returned to the network before the end of the countdown, the network may release the always-on PDU session to prevent waste of network resources.

In a first aspect of the application, a method of signaling enhancement for an always-on PDU session, executed by a UE, is provided. The method comprises the following steps: transmitting a Non-Access Stratum (NAS) request message to a mobile communication network, wherein the NAS request message comprises an Always-on PDU Session Requested (APSR) Information Element (IE); receiving a NAS response message comprising an Always-on PDU Session Indication (APSI) IE from the mobile communication network, wherein the APSI IE comprises a time length indicator; and in response to the APSI IE indicating that the always-on PDU session is not allowed, starting a timer based on the time length indicator and retransmitting the NAS request message to the mobile communication network when the timer expires.

In an example of the first aspect of the application, the NAS request message is a PDU SESSION ESTABLISHMENT REQUEST message, and the NAS response message is a PDU SESSION ESTABLISHMENT ACCEPT message.

In an example of the first aspect of the application, the NAS request message is a PDU SESSION MODIFICATION REQUEST message, and the NAS response message is a PDU SESSION MODIFICATION COMMAND message.

In an example of the first aspect of the application, the method further comprises: determining whether the UE has pending data to be transmitted over the always-on PDU session; wherein the starting of the timer is performed in response to the UE having pending data to be transmitted over the always-on PDU session.

In an example of the first aspect of the application, the APSR IE comprises a first lifetime length indicator indicating a request to configure a lifetime for the always-on PDU session, and the APSI IE comprises a second lifetime length indicator indicating whether the mobile communication network allows the request to configure a lifetime for the always-on PDU session.

In a second aspect of the application, a UE comprising a wireless transceiver and a controller is provided. The wireless transceiver is configured to perform wireless transmission and reception to and from a mobile communication network. The controller, coupled to the wireless transceiver, and configured to: transmit a NAS request message to the mobile communication network via the wireless transceiver, wherein the NAS request message comprises an APSR IE; receive a NAS response message comprising an APSI IE from the mobile communication network via the wireless transceiver, wherein the APSI IE comprises a time length indicator; and in response to the APSI IE indicating that the always-on PDU session is not allowed, start a timer based on the time length indicator and retransmit the NAS request message to the mobile communication network via the wireless transceiver when the timer expires.

In an example of the second aspect of the application, the NAS request message is a PDU SESSION ESTABLISHMENT REQUEST message, and the NAS response message is a PDU SESSION ESTABLISHMENT ACCEPT message.

In an example of the second aspect of the application, the NAS request message is a PDU SESSION MODIFICATION REQUEST message, and the NAS response message is a PDU SESSION MODIFICATION COMMAND message.

In an example of the second aspect of the application, the controller is further configured to determine whether the UE has pending data to be transmitted over the always-on PDU session; and wherein the timer is started in response to the UE having pending data to be transmitted over the always-on PDU session.

In an example of the second aspect of the application, the APSR IE comprises a first lifetime length indicator indicating a request to configure a lifetime for the always-on PDU session, and the APSI IE comprises a second lifetime length indicator indicating whether the mobile communication network allows the request to configure a lifetime for the always-on PDU session.

In a third aspect of the application, a method of signaling enhancement for an always-on PDU session, executed by a mobile communication network, is provided. The method comprises the following steps: receiving a NAS request message comprising an APSR IE from a UE, wherein the APSR IE comprises a first lifetime length indicator indicating a request to configure a lifetime for the always-on PDU session; in response to the always-on PDU session being allowed, transmitting a first NAS response message comprising a first APSI IE to the UE, wherein the first APSI IE indicates that the always-on PDU session is allowed, and the first APSI IE comprises a second lifetime length indicator indicating that the mobile communication network allows the request to configure a lifetime for the always-on PDU session; in response to the UE leaving the mobile communication network, starting a timer corresponding to the lifetime; and releasing the always-on PDU session in response to the UE not returning to the mobile communication network before the timer expires.

In an example of the third aspect of the application, the NAS request message is a PDU SESSION ESTABLISHMENT REQUEST message, and the first NAS response message is a PDU SESSION ESTABLISHMENT ACCEPT message.

In an example of the third aspect of the application, the NAS request message is a PDU SESSION MODIFICATION REQUEST message, and the first NAS response message is a PDU SESSION MODIFICATION COMMAND message.

In an example of the third aspect of the application, the method further comprises: maintaining the always-on PDU session before the timer expires; and resetting the timer in response to the UE returning to the mobile communication network before the timer expires.

In an example of the third aspect of the application, the method further comprises: in response to the always-on PDU session being not allowed, transmitting a second NAS response message comprising a second APSI IE to the UE, wherein the second APSI IE indicates that the always-on PDU session is not allowed, and the second APSI IE comprises a time length indicator indicating the UE to wait for a period of time before retransmitting the NAS request message.

Other aspects and features of the present application will become apparent to those with ordinarily skill in the art upon review of the following descriptions of specific embodiments of the apparatuses and the methods of signaling enhancement for always-on PDU session.

BRIEF DESCRIPTION OF THE DRAWINGS

The present application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
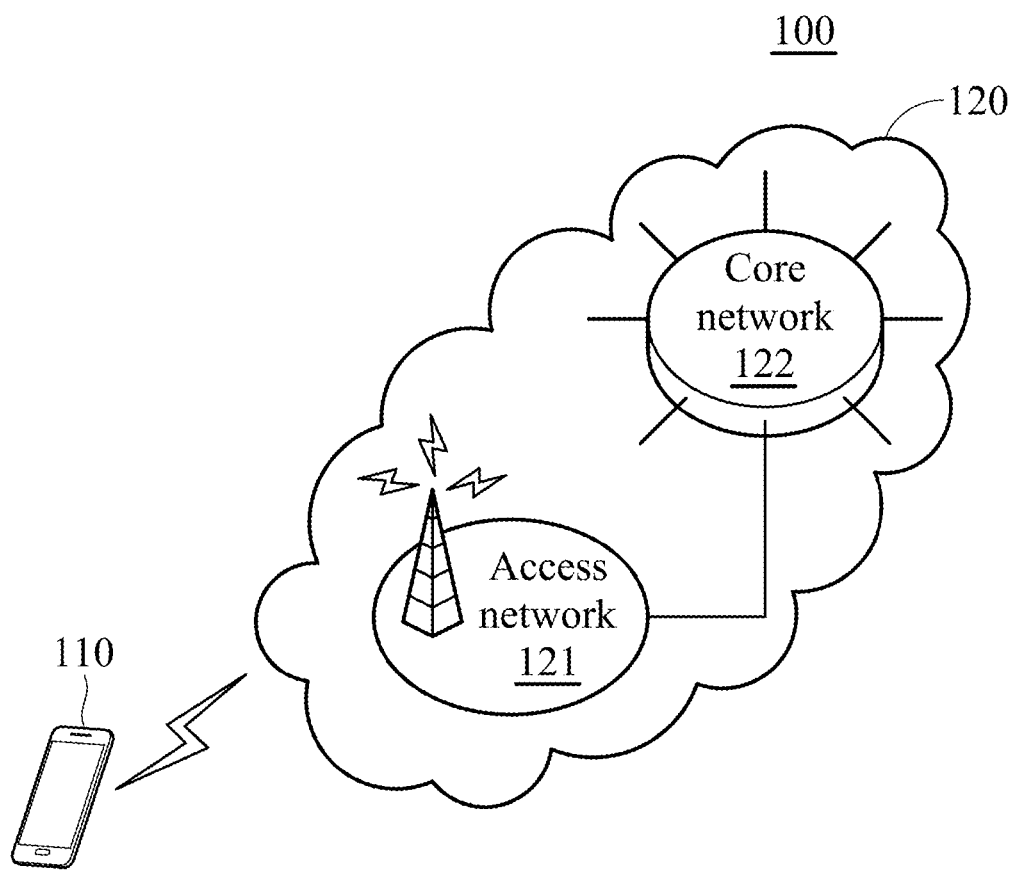
FIG. 1 is a block diagram illustrating a mobile communication environment according to an embodiment of the application.

FIG. 1 is a block diagram illustrating a mobile communication environment according to an embodiment of the application.

As shown in FIG. 1, the mobile communication environment 100 may include a UE 110 and a mobile communication network 120. The UE 110 may wirelessly connect to the mobile communication network 120 to establish a PDU session (e.g., always-on PDU session) for obtaining mobile services, including voice services and data services.

The UE 110 may be a smartphone, a wearable electronic apparatus, an in-vehicle communication device, a panel Personal Computer (PC), a laptop computer, or any computing device supporting the RAT utilized by the mobile communication network 120.

The mobile communication network 120 may include an access network 121 and a core network 122. The access network is responsible for processing radio signals, terminating radio protocols, and connecting the UE 110 with the core network 122. The core network 122 is responsible for performing mobility management, network-side authentication, and interfaces with public/external networks (e.g., the Internet). The access network 121 and the core network 122 may each include one or more network nodes for carrying out said functions.

In one embodiment, the mobile communication network 120 may be a 5G network (e.g., an NR network), and the access network 121 and the core network 122 may be a Next Generation Radio Access Network (NG-RAN) and a Next Generation Core Network (NG-CN), respectively.

The NG-RAN may include one or more base stations, such as next generation NodeBs (gNBs), which support high frequency bands (e.g., above 24 GHz), and each gNB may further include one or more Transmission Reception Points (TRPs). Each gNB and TRP may be referred to as a 5G base station.

Each 5G base station may form one or more cells to provide wireless accesses to the UE 110. For example, the UE 110 may camp on one or more cells, wherein the camped cells may be referred to as serving cells.

The NG-CN generally consists of various network function entities, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure. In particular, UPF may be in charge of PDU session (e.g., always-on PDU session) management, including establishment, modification, and release of PDU sessions, according to the instructions from SMF.

Please note that one novel aspect of the application is to improve the PDU session establishment/modification procedure, by introducing new parameters to activate a retry backoff mechanism in the UE side for holding off the resending of the PDU SESSION ESTABLISHMENT/MODIFICATION REQUEST message, and to activate a lifetime mechanism in the network side for configuring the lifetime of an always-on PDU session. Advantageously, the retry backoff mechanism may ensure that the UE waits for a certain period of time before resending the PDU SESSION ESTABLISHMENT/MODIFICATION REQUEST message, so that frequent signaling may be avoided. In addition, the lifetime mechanism allows the network side to count down a predetermined period of time representing the lifetime of the always-on PDU session when detecting that the UE has left the network (e.g., the UE switching to another network due to bad signal quality of the current network or due to the user selecting another RAT), and if the UE hasn't returned to the network before the end of the countdown, the network may release the always-on PDU session to prevent waste of network resources.

Figure 2:
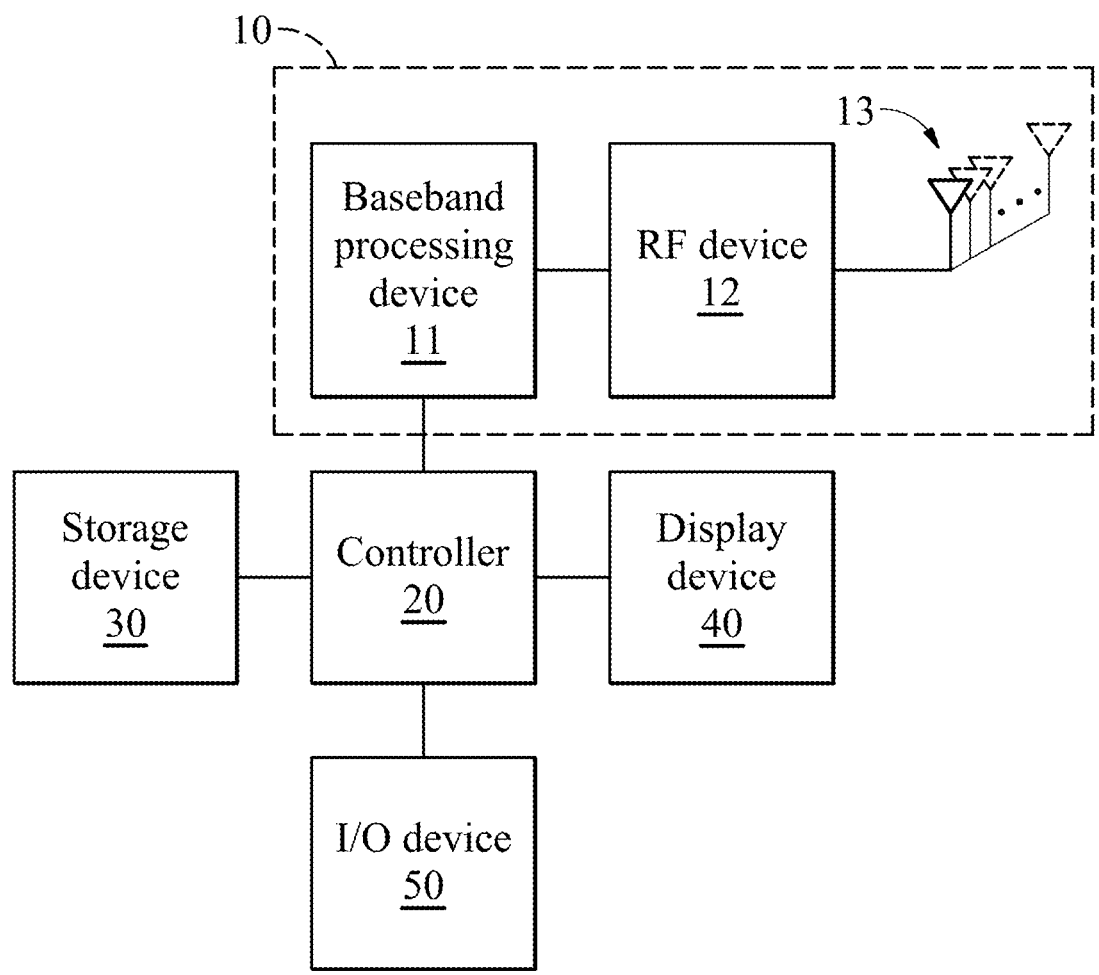
FIG. 2 shows an exemplary hardware architecture of the UE 110 according to an embodiment of the application.

FIG. 2 shows an exemplary hardware architecture of the UE 110 according to an embodiment of the application.

As shown in FIG. 2, the UE 110 may include a wireless transceiver 10, a controller 20, a storage device 30, a display device 40, and an Input/Output (I/O) device 50.

The wireless transceiver 10 is configured to perform wireless transmission and reception to and from the mobile communication network 120 using an RAT.

Specifically, the wireless transceiver 10 may include a baseband processing device 11, a Radio Frequency (RF) device 12, and antenna 13, wherein the antenna 13 may include an antenna array for beamforming.

The baseband processing device 11 may contain multiple hardware components to perform baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technology, wherein the radio frequency may be 900 MHz, 2100 MHz, or 2.6 GHz utilized in the 4G technology (e.g., the LTE/LTE-A/TD-LTE technology), or may be 24 GHz~300 GHz utilized in the 5G technology (e.g., the NR technology), or another radio frequency, depending on the RAT in use.

The controller 20 may be a general-purpose processor, a Micro Control Unit (MCU), an Application Processor (AP), a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the mobile communication network 120, storing and retrieving data (e.g., program code of the 5G communication protocol) to and from the storage device 30, sending a series of frame data to the display device 40, and receiving user inputs or outputting signals via the I/O device 50. In particular, the controller 20 coordinates the aforementioned operations of the wireless transceiver 10, the storage device 30, the display device 40, and the I/O device 50 for performing the method of signaling enhancement for an always-on PDU session.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. More specifically, the controller 20 may include three components, including a control unit, an Arithmetic Logic Unit (ALU), and a register, but the application is not limited thereto. The control unit is responsible for controlling function executions according the instructions in program code. The ALU is responsible for performing arithmetic and bitwise operations on integer binary numbers. The register may be realized with a single piece of hardware to store data for arithmetic and bitwise operations and instructions to be executed by the control unit, or may be realized with two independent pieces of hardware to separately store data for arithmetic and bitwise operations and instructions to be executed by the control unit.

The storage device 30 may be a non-transitory computer-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, an Operating System (OS), and/or a communication protocol (e.g., the 5G communication protocol). For example, the method of the present application may be implemented as program code of a part (e.g., the NAS layer) of the 5G communication protocol. In addition to the NAS layer, the 5G communication protocol may include a Physical (PHY) layer, a Medium Access Control (MAC) layer, a Radio Link Control (RLC) layer, a Radio Resource Control (RRC) layer, a Packet Data Convergence Protocol (PDCP) layer, and a Service Data Adaptation Protocol (SDAP) layer.

The display device 40 may be a Liquid-Crystal Display (LCD), a Light-Emitting Diode (LED) display, an Organic LED (OLED) display, or an Electronic Paper Display (EPD), etc., for providing a display function.

In another embodiment, the display device 40 may further include one or more touch sensors disposed thereon or thereunder for sensing touches, contacts, or approximations of objects (e.g., fingers or styluses), thereby enabling the display device 40 to serve as a touch-sensitive display device.

The I/O device 50 may include one or more buttons, a keyboard, a mouse, a touch pad, a video camera, a microphone, a speaker, and/or sensors (e.g., a barometric/temperature sensor, a humidity sensor, and/or a blood-pressure/heart-rate/body-temperature sensor), etc., to serve as the Man-Machine Interface (MMI) for interaction with users.

It should be understood that the components described in the embodiment of FIG. 2 are for illustrative purposes only and are not intended to limit the scope of the application. For example, the UE 110 may include more components, such as a Global Positioning System (GPS) device for use of some location-based services or applications, and/or a battery for powering the other components of the UE 110, etc. Alternatively, the UE 110 may include fewer components. For example, the UE 110 may not include the display device 40 and/or the I/O device 50.

Figure 3:
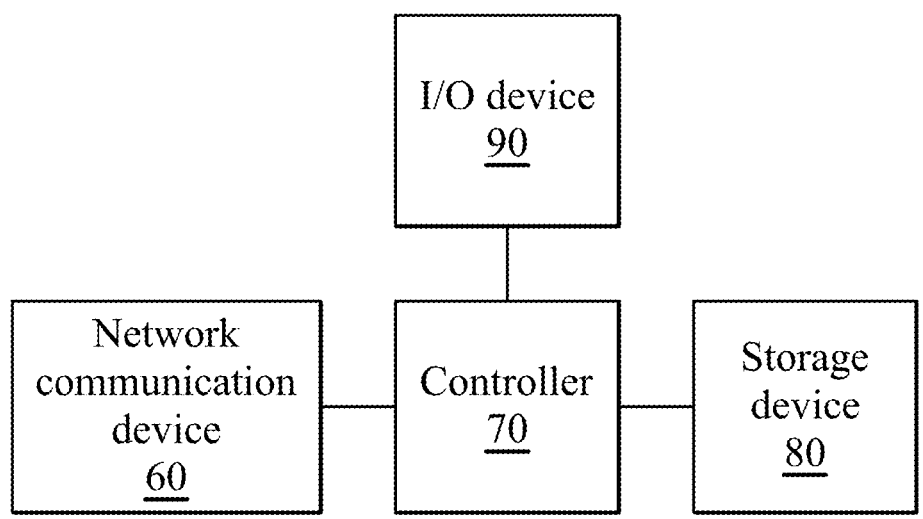
FIG. 3 shows an exemplary hardware architecture of a core network function entity according to an embodiment of the application.

FIG. 3 shows an exemplary hardware architecture of a core network function entity according to an embodiment of the application.

In one example, the core network function entity may refer to a computing device providing one or more network functions (e.g., UPF) of the core network 122. As shown in FIG. 3, the core network function entity may include a network communication device 60, a controller 70, and a storage device 80, and an I/O device 90.

The network communication device 60 is responsible for providing wired network access to the access network 121 and other core network function entity of the core network 122. In one example, the network communication device 60 may include an Ethernet card, an Asymmetric Digital Subscriber Line (ADSL) card, a fiber network card, or a communication device using another wired communication technology.

The controller 70 may be a general-purpose processor, an MCU, an AP, a DSP, a GPU, an HPU, an NPU, or the like, which includes various circuits for providing the functions of data processing and computing, controlling the network communication device 60 for communications with the access network 121 and other core network function entity of the core network 122, storing and retrieving data (e.g., program code of the 5G communication protocol) to and from the storage device 80, and receiving or outputting signals via the I/O device 90. In particular, the controller 70 coordinates the aforementioned operations of the network communication device 60, the storage device 80, and the I/O device 90 for performing the method of signaling enhancement for an always-on PDU session.

As will be appreciated by persons skilled in the art, the circuits of the controller 70 will typically include transistors that are configured in such a way as to control the operation of the circuits in accordance with the functions and operations described herein. As will be further appreciated, the specific structure or interconnections of the transistors will typically be determined by a compiler, such as an RTL compiler. RTL compilers may be operated by a processor upon scripts that closely resemble assembly language code, to compile the script into a form that is used for the layout or fabrication of the ultimate circuitry. More specifically, the controller 70 may include three components, including a control unit, an ALU, and a register, but the application is not limited thereto. The control unit is responsible for controlling function executions according the instructions in program code. The ALU is responsible for performing arithmetic and bitwise operations on integer binary numbers. The register may be realized with a single piece of hardware to store data for arithmetic and bitwise operations and instructions to be executed by the control unit, or may be realized with two independent pieces of hardware to separately store data for arithmetic and bitwise operations and instructions to be executed by the control unit.

The storage device 80 may be a non-transitory computer-readable storage medium, including a memory, such as a FLASH memory or a NVRAM, or a magnetic storage device, such as a hard disk or a magnetic tape, or an optical disc, or any combination thereof for storing instructions and/or program code of applications, an OS, and/or a communication protocol (e.g., the 5G communication protocol).

The I/O device 90 may include one or more buttons, a keyboard, a mouse, a touch pad, a video camera, a microphone, and/or a speaker, etc., to serve as the MMI for interaction with network managers.

It should be understood that the components described in the embodiment of FIG. 3 are for illustrative purposes only and are not intended to limit the scope of the application. For example, the core network function entity may include more components, such as a display device for providing a display function. Alternatively, the core network function entity may include fewer components. For example, the core network function entity may not include the I/O device 90.

Figure 4:
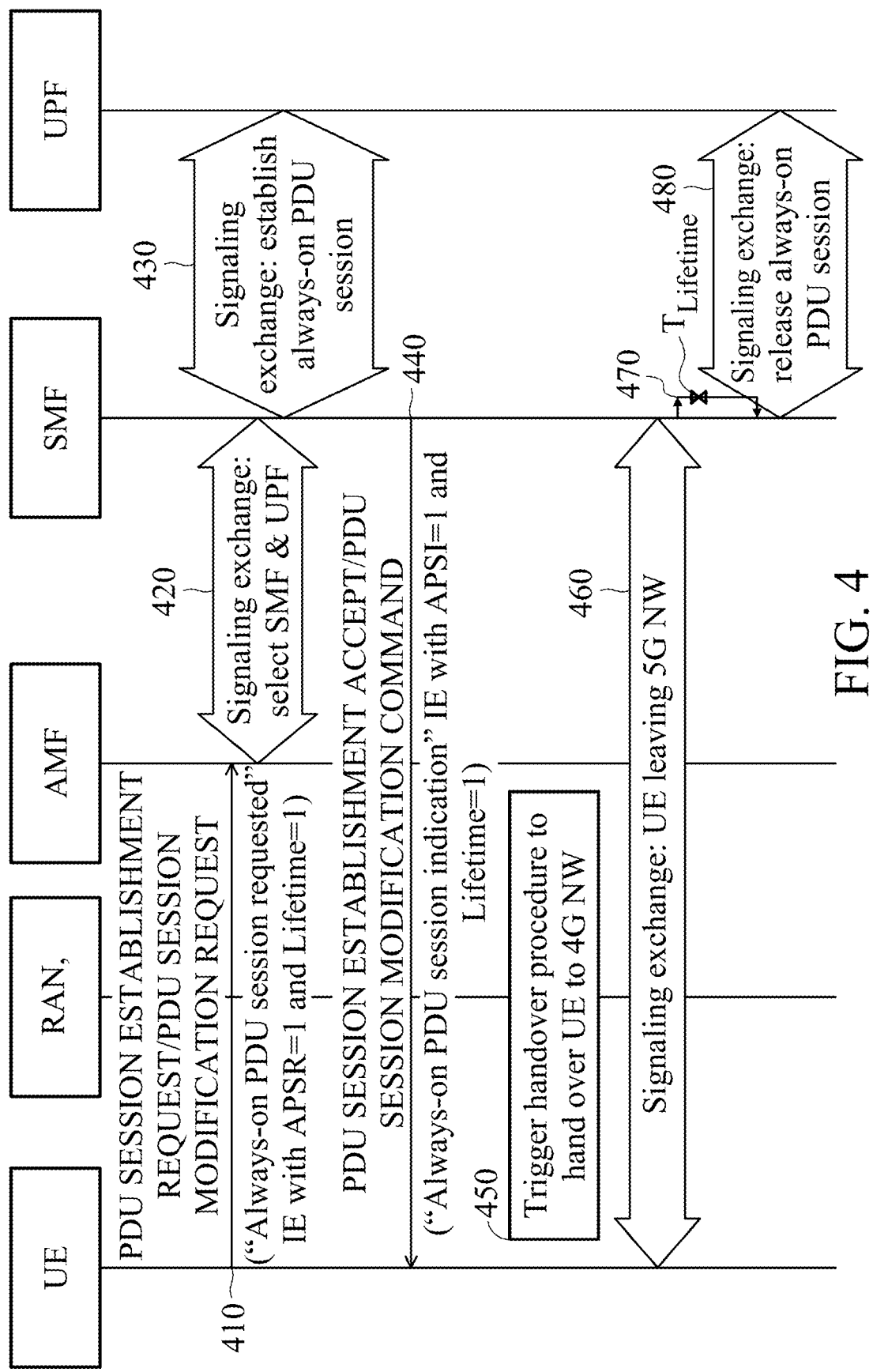
FIG. 4 is a message sequence chart illustrating the signaling enhancements for an always-on PDU session according to an embodiment of the application.

FIG. 4 is a message sequence chart illustrating the signaling enhancements for an always-on PDU session according to an embodiment of the application.

In step S410, the UE transmits a PDU SESSION ESTABLISHMENT REQUEST message or a PDU SESSION MODIFICATION REQUEST message to the AMF. Specifically, the PDU SESSION ESTABLISHMENT REQUEST message or the PDU SESSION MODIFICATION REQUEST message may include an Always-on PDU Session Requested (APSR) IE. The APSR IE may include an APSR field and a Lifetime length indicator, wherein the APSR field indicates that an always-on PDU session is requested (i.e., the UE requests establishment of an always-on PDU session), and the Lifetime length indicator indicates that a lifetime is requested (i.e., the UE requests that the 5G network configures a lifetime of the always-on PDU session).

For example, the APSR IE may consist of 8 bits, in which the first bit is the APSR field, the fifth to eighth bits are the IE Identifier (WI) of the APSR IE, and the remaining bits are reserved. In particular, one of the reserved bits (e.g., the second bit) may be used as the Lifetime length indicator which is newly introduced in the present application.

In one embodiment, the content of the APSR IE is shown below in Table 1, but the application is not limited thereto.

TABLE 1

| 8 | 7 | 6 | 5 | 4 | 3 | 2 | 1 |
|---|---|---|---|---|---|---|---|
| Always-on PDU session requested IEI | | | | 0 Spare | 0 Spare | Lifetime | APSR | octet 1 |

In one embodiment, the values and meanings of the APSR field and the Lifetime length indicator in the APSR IE are shown below in Table 2, but the application is not limited thereto.

TABLE 2

| APSR (bit 1) | Lifetime (bit 2) | meaning |
|---|---|---|
| 0 | 0 | UE does not request an always-on PDU session, and does not request to configure a lifetime of the always-on PDU session. |
| 1 | 1 | UE does request an always-on PDU session, and does request to configure a lifetime of the always-on PDU session. |

In step S420, signaling exchange between the AMF and SMF is performed to select SMF and UPF for handling the establishment/modification of an always-on PDU session.

In step S430, signaling exchange between the SMF and UPF is performed to establish an always-on PDU session.

In step S440, the SMF determines, based on its available resources, to allow the establishment of the always-on PDU session and the configuration of the lifetime of the always-on PDU session, and thus, transmits a PDU SESSION ESTABLISHMENT ACCEPT message or a PDU SESSION MODIFICATION COMMAND message to the UE. Specifically, the PDU SESSION ESTABLISHMENT ACCEPT message or the PDU SESSION MODIFICATION COMMAND message includes an Always-on PDU Session Indication (APSI) IE. The APSI IE includes an APSI field and a Lifetime length indicator, wherein the APSI field indicates that the always-on PDU Session is required (i.e., the 5G network allows establishment of the always-on PDU session), and the Lifetime length indicator indicates that the lifetime is allowed (i.e., the 5G network allows the configuration of the lifetime of the always-on PDU session).

For example, the APSI IE may consist of 8 bits, in which the first bit is the APSI field, the fifth to eighth bits are the IEI of the APSI IE, and the remaining bits are reserved. In particular, one of the reserved bits (e.g., the second bit) may be used as the Lifetime length indicator which is newly introduced in the present application.

In one embodiment, the content of the APSI IE is shown below in Table 3, but the application is not limited thereto.

TABLE 3

| 8 | 7 | 6 | 5 | 4 | 3 | 2 | 1 |
|---|---|---|---|---|---|---|---|
| Always-on PDU session indication IEI | | | | 0 Spare | 0 Spare | Lifetime | APSI | octet 1 |

In one embodiment, the values and meanings of the APSI field and the Lifetime length indicator in the APSI IE are shown below in Table 4, but the application is not limited thereto.

TABLE 4

| APSI (bit 1) | Lifetime (bit 2) | meaning |
|---|---|---|
| 0 | 0 | NW does not allow UE's request of an always-on PDU session (e.g., due to NW being busy), and does not allow UE's request of configuration of a lifetime of the always-on PDU session. |
| 1 | 0 | NW allows UE's request of an always-on PDU session, but does not allow UE's request of configuration of a lifetime of the always-on PDU session (e.g., due to NW not allowing the always-on PDU session to be released, or there being pending message/data on this always-on PDU session). Therefore, NW will determine, in its own terms, whether to release the always-on PDU session. |
| 1 | 1 | NW allows UE's request of an always-on PDU session, and allows UE's request of configuration of a lifetime of the always-on PDU session. NW will start the lifetime countdown when detecting UE leaving NW, and release the always-on PDU session when the countdown ends and UE hasn't returned to NW. |

In step S450, the RAN triggers a handover procedure to hand over the UE to a 4G network. Specifically, the UE may transmit a measurement report to the RAN, and the RAN may determine whether to trigger the handover procedure based on the measurement report.

In step S460, signaling exchange between the UE and SMF is performed to handle the operations related to the UE leaving the 5G network. Specifically, various network function entities may need to carry out necessary signaling exchange with one another to process the handover procedure, and then the 5G network may send a handover command to the UE. The UE may follow the handover command to leave the 5G network (e.g., switch to a 4G network) and reply to the 5G network with a handover complete message. When receiving the handover complete message, the 5G network may determine that the UE has left the 5G network.

In step S470, the SMF starts a timer (denoted as $T_{Lifetime}$ in FIG. 4) to count a period of time representing the lifetime of the always-on PDU session. In one example, the period of time may be determined by the 5G network (e.g., by the SMF).

In step S480, the SMF detects that the UE has not returned to the 5G network before the timer expires, and thus, signaling exchange between the SMF and UPF is performed to release the always-on PDU session.

Figure 5A:
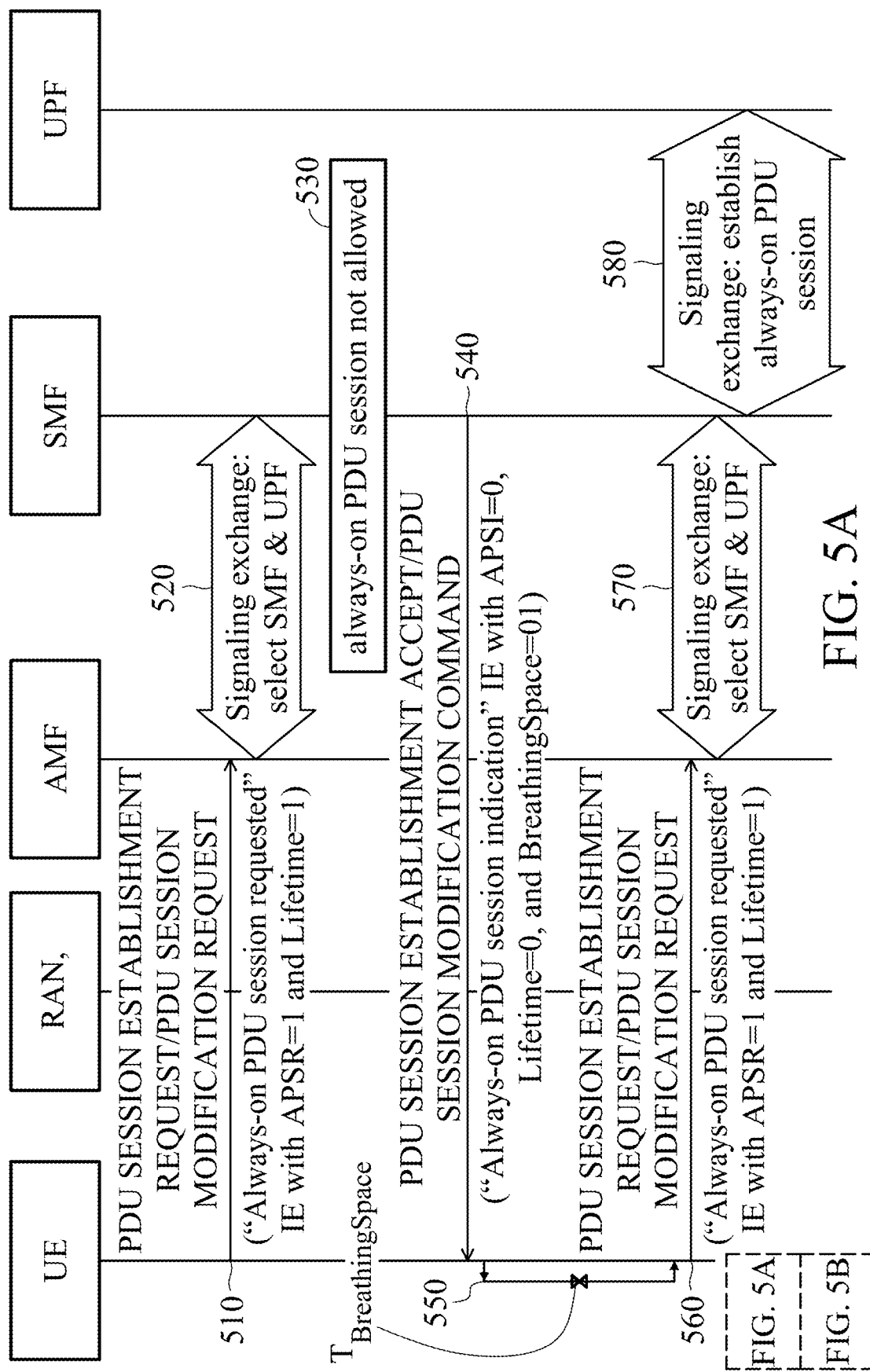
FIGS. 5A and 5B show a message sequence chart illustrating the signaling enhancements for an always-on PDU session according to another embodiment of the application.
Figure 5B:
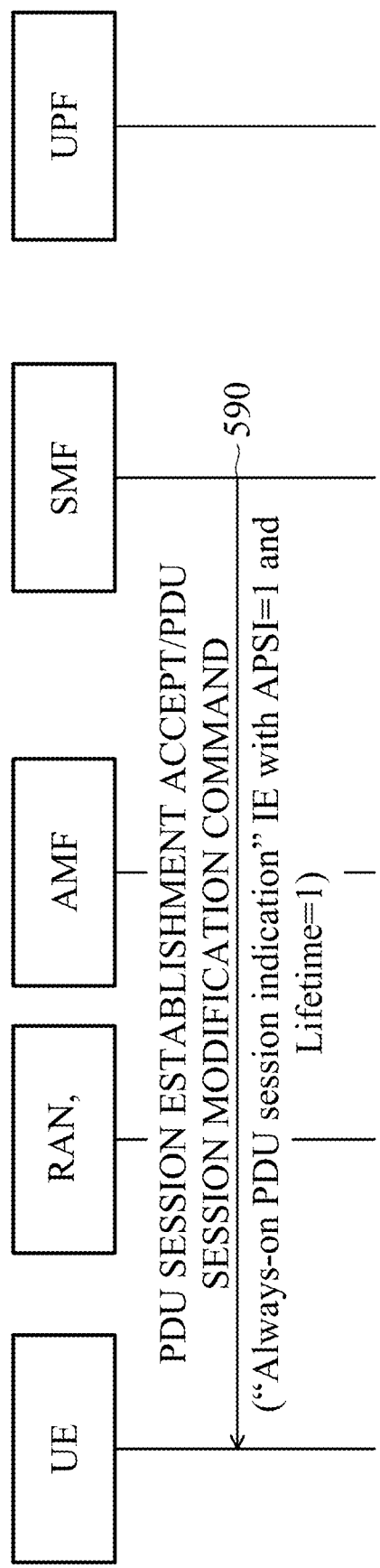

FIGS. 5A and 5B show a message sequence chart illustrating the signaling enhancements for an always-on PDU session according to another embodiment of the application.

In step S510, the UE transmits a PDU SESSION ESTABLISHMENT REQUEST message or a PDU SESSION MODIFICATION REQUEST message to the AMF. Specifically, the PDU SESSION ESTABLISHMENT REQUEST message or the PDU SESSION MODIFICATION REQUEST message may include an APSR IE. The APSR IE may include an APSR field and a Lifetime length indicator, wherein the APSR field indicates that an always-on PDU session is requested (i.e., the UE requests establishment of an always-on PDU session), and the Lifetime length indicator indicates that a lifetime is requested (i.e., the UE requests that the 5G network configures a lifetime of the always-on PDU session).

Regarding the content and configuration of the APSR IE, reference may be made to the embodiment of FIG. 4 and Tables 1~2, and detailed description is omitted herein for brevity.

In step S520, signaling exchange between the AMF and SMF is performed to select SMF and UPF for handling the establishment/modification of an always-on PDU session.

In step S530, the SMF determines, based on its available resources, that the establishment of the always-on PDU session and the configuration of the lifetime of the always-on PDU session are not allowed.

In step S540, the SMF transmits a PDU SESSION ESTABLISHMENT ACCEPT message or a PDU SESSION MODIFICATION COMMAND message to the UE. Specifically, the PDU SESSION ESTABLISHMENT ACCEPT message or the PDU SESSION MODIFICATION COMMAND message includes an APSI IE. The APSI IE includes an APSI field, a Lifetime length indicator, and a time length indicator (denoted as BreathingSpace in FIG. 5A). The APSI field indicates that the always-on PDU Session is not allowed (i.e., the 5G network does not allow establishment of the always-on PDU session). The Lifetime length indicator indicates that the lifetime is not allowed (i.e., the 5G network does not allow the configuration of the lifetime of the always-on PDU session). The time length indicator indicates a period of time for which the UE should wait before retransmitting the PDU SESSION ESTABLISHMENT REQUEST message or the PDU SESSION MODIFICATION REQUEST message.

For example, the APSI IE may consist of 8 bits, in which the first bit is the APSI field, the fifth to eighth bits are the IEI of the APSI IE, and the remaining bits are reserved. In particular, one of the reserved bits (e.g., the second bit) may be used as the Lifetime length indicator which is newly introduced in the present application, and one or more of the reserved bits (e.g., the third and fourth bits) may be used as the time length indicator which is newly introduced in the present application.

In one embodiment, the content of the APSI IE is shown below in Table 5, but the application is not limited thereto.

TABLE 5

| 8 | 7 | 6 | 5 | 4 | 3 | 2 | 1 |
|---|---|---|---|---|---|---|---|
| Always-on PDU session indication IEI | | | | Breathing Space | | Lifetime | APSI octet 1 |

Reference may be made to Table 4 for the values and meanings of the APSI field and the Lifetime length indicator in the APSI IE. In one embodiment, the values and meanings of the time length indicator in the APSI IE are shown below in Table 6, but the application is not limited thereto.

TABLE 6

BreathingSpace

| (bit 3) | (bit 4) | meaning |
|---|---|---|
| 0 | 0 | UE has to wait 10 seconds before retransmitting request of always-on PDU session establishment |
| 0 | 1 | UE has to wait 1 minute before retransmitting request of always-on PDU session establishment |
| 1 | 0 | UE has to wait 10 minutes before retransmitting request of always-on PDU session establishment |
| 1 | 1 | UE has to wait 1 hour before retransmitting request of always-on PDU session establishment |

In step S550, the UE starts a timer (denoted as $T_{BreathingSpace}$ in FIG. 5A) based on the time length indicator, and the UE should not retransmit the request of always-on PDU session establishment before the timer expires.

In step S560, after the time expires, the UE retransmits the PDU SESSION ESTABLISHMENT REQUEST message or the PDU SESSION MODIFICATION REQUEST message to the AMF. Specifically, the retransmitted PDU SESSION ESTABLISHMENT/MODIFICATION REQUEST message may have the same content as the PDU SESSION ESTABLISHMENT/MODIFICATION REQUEST message in step S510.

In step S570, signaling exchange between the AMF and SMF is performed to select SMF and UPF for handling the establishment/modification of an always-on PDU session.

In step S580, signaling exchange between the SMF and UPF is performed to establish an always-on PDU session.

In step S590, the SMF determines, based on its available resources, to allow the establishment of the always-on PDU session and the configuration of the lifetime of the always-on PDU session, and thus, transmits a PDU SESSION ESTABLISHMENT ACCEPT message or a PDU SESSION MODIFICATION COMMAND message to the UE. Specifically, the PDU SESSION ESTABLISHMENT ACCEPT message or the PDU SESSION MODIFICATION COMMAND message includes an APSI IE. The APSI IE includes an APSI field and a Lifetime length indicator, wherein the APSI field indicates that the always-on PDU Session is required (i.e., the 5G network allows establishment of the always-on PDU session), and the Lifetime length indicator indicates that the lifetime is allowed (i.e., the 5G network allows the configuration of the lifetime of the always-on PDU session).

Regarding the content and configuration of the APSI IE, reference may be made to the embodiment of FIG. 4 and Tables 3~4, and detailed description is omitted herein for brevity.

Figure 6:
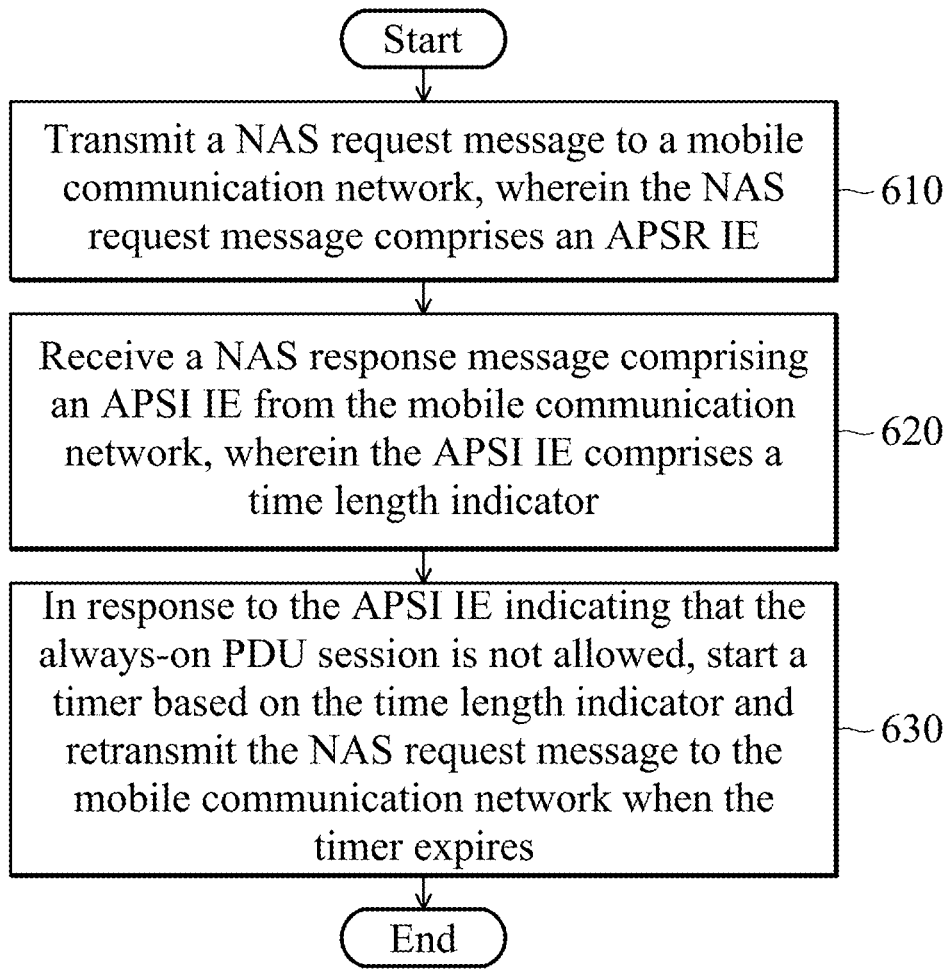
FIG. 6 is a flow chart illustrating the method of signaling enhancement for an always-on PDU session according to an embodiment of the application.

FIG. 6 is a flow chart illustrating the method of signaling enhancement for an always-on PDU session according to an embodiment of the application.

In this embodiment, the method of signaling enhancement for an always-on PDU session is applied to and executed by a UE (e.g., the UE 110) which at least includes a wireless transceiver (e.g., the wireless transceiver 10) and a controller (e.g., the controller 20).

In step S610, the UE transmits a NAS request message to a mobile communication network, wherein the NAS request message includes an APSR IE.

In one example, the NAS request message may be a PDU SESSION ESTABLISHMENT REQUEST message. In another example, the NAS request message may be a PDU SESSION MODIFICATION REQUEST message.

In step S620, the UE receives a NAS response message including an APSI IE from the mobile communication network, wherein the APSI IE includes a time length indicator.

In one example, the NAS response message may be a PDU SESSION ESTABLISHMENT ACCEPT message. In another example, the NAS response message may be a PDU SESSION MODIFICATION COMMAND message.

In step S630, the UE starts a timer based on the time length indicator and retransmits the NAS request message to the mobile communication network when the timer expires, in response to the APSI IE indicating that the always-on PDU session is not allowed.

In one example, the UE may determining whether it has pending data to be transmitted over the always-on PDU session, and the timer may be started in response to the UE having pending data to be transmitted over the always-on PDU session.

In one example, reference may be made to the embodiment of FIGS. 5A~5B for the detailed description of the operations related to the time length indicator (i.e., BreathingSpace) and the timer (i.e., $T_{BreathingSpace}$).

Figure 7:
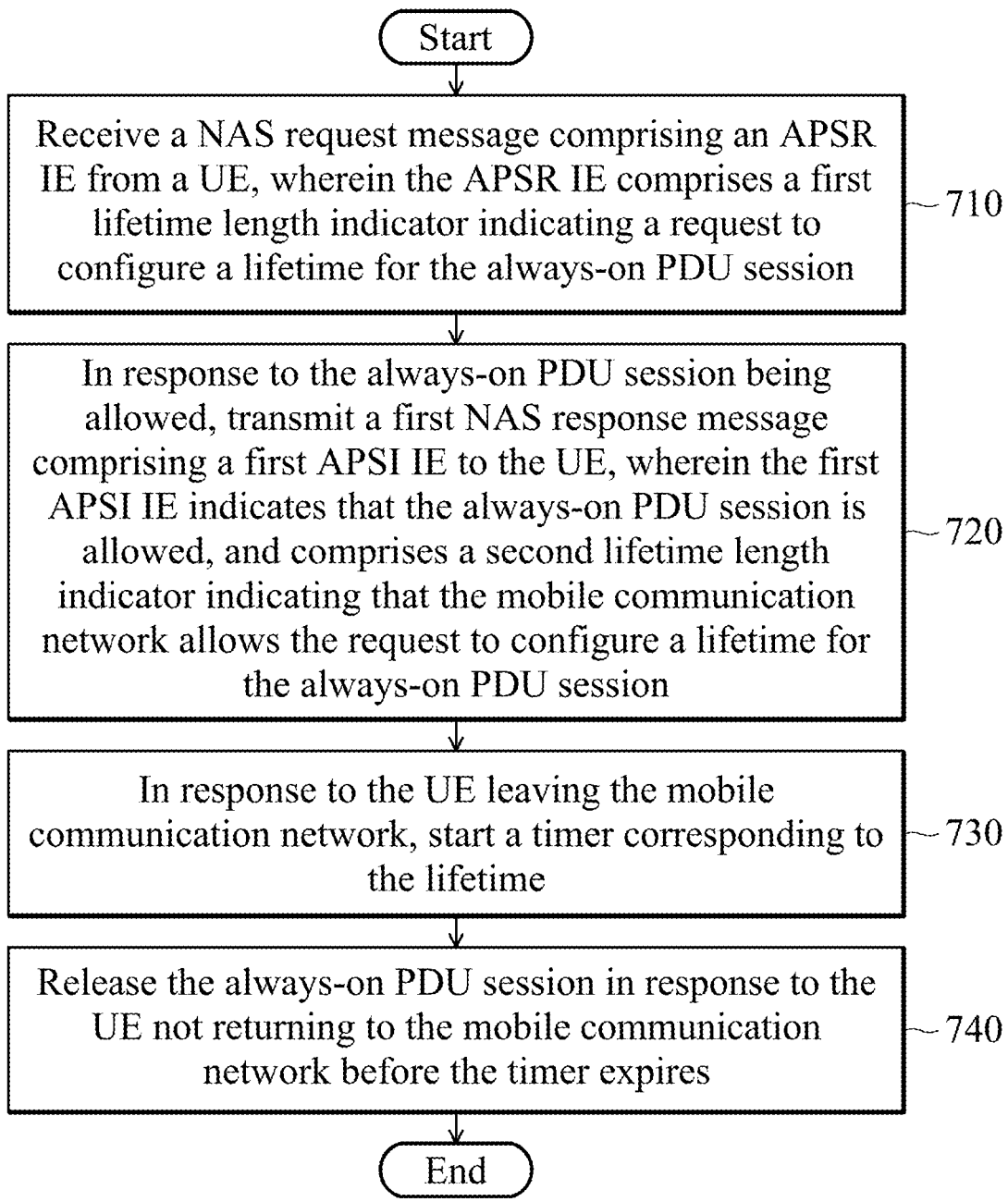
FIG. 7 is a flow chart illustrating the method of signaling enhancement for an always-on PDU session according to another embodiment of the application.

FIG. 7 is a flow chart illustrating the method of signaling enhancement for an always-on PDU session according to another embodiment of the application.

In this embodiment, the method of signaling enhancement for an always-on PDU session is applied to and executed by a mobile communication network (e.g., the mobile communication network 120) which at least includes an access network (e.g., the access network 121) and a core network (e.g., the core network 122).

In step S710, the mobile communication network receives a NAS request message including an APSR IE from a UE, wherein the APSR IE includes a first lifetime indicator indicating a request to configure a lifetime for the always-on PDU session.

In one example, the NAS request message may be a PDU SESSION ESTABLISHMENT REQUEST message. In another example, the NAS request message may be a PDU SESSION MODIFICATION REQUEST message.

In step S720, the mobile communication network transmits a first NAS response message including a first APSI IE to the UE in response to the always-on PDU session being allowed, wherein the first APSI IE indicates that the always-on PDU session is allowed, and includes a second lifetime indicator indicating that the mobile communication network allows the request to configure a lifetime for the always-on PDU session.

In one example, the NAS response message may be a PDU SESSION ESTABLISHMENT ACCEPT message. In another example, the NAS response message may be a PDU SESSION MODIFICATION COMMAND message.

In step S730, the mobile communication network starts a timer corresponding to the lifetime in response to the UE leaving the mobile communication network.

In step S740, the mobile communication network releases the always-on PDU session in response to the UE not returning to the mobile communication network before the timer expires.

In another embodiment, the mobile communication network may maintain the always-on PDU session before the timer expires, and reset the timer in response to the UE returning to the mobile communication network before the timer expires.

In one example, reference may be made to the embodiment of FIG. 4 for the detailed description of the operations related to the lifetime indicator (i.e., Lifetime) and the timer (i.e., $T_{Lifetime}$).

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method of signaling enhancement for an always-on Protocol Data Unit (PDU) session, executed by a User Equipment (UE), the method comprising:
    transmitting a Non-Access Stratum (NAS) request message to a mobile communication network, wherein the NAS request message comprises an Always-on PDU Session Requested (APSR) Information Element (IE);
    receiving a NAS response message comprising an Always-on PDU Session Indication (APSI) IE from the mobile communication network, wherein the APSI IE comprises a time length indicator; and
    in response to the APSI IE indicating that the always-on PDU session is not allowed, starting a timer based on the time length indicator and retransmitting the NAS request message to the mobile communication network when the timer expires;
    wherein the APSR IE comprises a first lifetime length indicator indicating a request to configure a lifetime for the always-on PDU session, and the APSI IE comprises a second lifetime length indicator indicating whether the mobile communication network allows the request to configure a lifetime for the always-on PDU session.

2. The method as claimed in claim 1, wherein the NAS request message is a PDU SESSION ESTABLISHMENT REQUEST message, and the NAS response message is a PDU SESSION ESTABLISHMENT ACCEPT message.

3. The method as claimed in claim 1, wherein the NAS request message is a PDU SESSION MODIFICATION REQUEST message, and the NAS response message is a PDU SESSION MODIFICATION COMMAND message.

4. The method as claimed in claim 1, further comprising:
    determining whether the UE has pending data to be transmitted over the always-on PDU session;
    wherein the starting of the timer is performed in response to the UE having pending data to be transmitted over the always-on PDU session.

5. A User Equipment (UE), comprising:
a wireless transceiver, configured to perform wireless transmission and reception to and from a mobile communication network; and
a controller, coupled to the wireless transceiver, and configured to:
transmit a Non-Access Stratum (NAS) request message to the mobile communication network via the wireless transceiver, wherein the NAS request message comprises an Always-on Protocol Data Unit (PDU) Session Requested (APSR) Information Element (IE);
receive a NAS response message comprising an Always-on PDU Session Indication (APSI) IE from the mobile communication network via the wireless transceiver, wherein the APSI IE comprises a time length indicator; and
in response to the APSI IE indicating that the always-on PDU session is not allowed, start a timer based on the time length indicator and retransmit the NAS request message to the mobile communication network via the wireless transceiver when the timer expires;
wherein the APSR IE comprises a first lifetime length indicator indicating a request to configure a lifetime for the always-on PDU session, and the APSI IE comprises a second lifetime length indicator indicating whether the mobile communication network allows the request to configure a lifetime for the always-on PDU session.

6. The UE as claimed in claim 5, wherein the NAS request message is a PDU SESSION ESTABLISHMENT REQUEST message, and the NAS response message is a PDU SESSION ESTABLISHMENT ACCEPT message.

7. The UE as claimed in claim 5, wherein the NAS request message is a PDU SESSION MODIFICATION REQUEST message, and the NAS response message is a PDU SESSION MODIFICATION COMMAND message.

8. The UE as claimed in claim 5, wherein the controller is further configured to determine whether the UE has pending data to be transmitted over the always-on PDU session; and wherein the timer is started in response to the UE having pending data to be transmitted over the always-on PDU session.

9. A method of signaling enhancement for an always-on Protocol Data Unit (PDU) session, executed by a mobile communication network, the method comprising:
receiving a Non-Access Stratum (NAS) request message comprising an Always-on PDU Session Requested (APSR) Information Element (IE) from a User Equipment (UE), wherein the APSR IE comprises a first lifetime length indicator indicating a request to configure a lifetime for the always-on PDU session;
in response to the always-on PDU session being allowed, transmitting a first NAS response message comprising a first Always-on PDU Session Indication (APSI) IE to the UE, wherein the first APSI IE indicates that the always-on PDU session is allowed, and the first APSI IE comprises a second lifetime length indicator indicating that the mobile communication network allows the request to configure a lifetime for the always-on PDU session;
in response to the UE leaving the mobile communication network, starting a timer corresponding to the lifetime; and
releasing the always-on PDU session in response to the UE not returning to the mobile communication network before the timer expires.

10. The method as claimed in claim 9, wherein the NAS request message is a PDU SESSION ESTABLISHMENT REQUEST message, and the first NAS response message is a PDU SESSION ESTABLISHMENT ACCEPT message.

11. The method as claimed in claim 9, wherein the NAS request message is a PDU SESSION MODIFICATION REQUEST message, and the first NAS response message is a PDU SESSION MODIFICATION COMMAND message.

12. The method as claimed in claim 9, further comprising:
maintaining the always-on PDU session before the timer expires; and
resetting the timer in response to the UE returning to the mobile communication network before the timer expires.

13. The method as claimed in claim 9, further comprising:
in response to the always-on PDU session being not allowed, transmitting a second NAS response message comprising a second APSI IE to the UE, wherein the second APSI IE indicates that the always-on PDU session is not allowed, and the second APSI IE comprises a time length indicator indicating the UE to wait for a period of time before retransmitting the NAS request message.

* * * * *